United States Patent [19]

Weidenbach et al.

[11] 4,061,713

[45] Dec. 6, 1977

[54] PURIFICATION OF EXHAUST GASES

[75] Inventors: Guenter Weidenbach, Hannover, Germany; André Lecloux; Yves Gobillon, both of Brussels, Belgium

[73] Assignee: Kali-Chemie Aktiengesellschaft, Hannover, Germany

[21] Appl. No.: 718,512

[22] Filed: Aug. 30, 1976

[30] Foreign Application Priority Data

Aug. 30, 1975 Germany .............................. 2538706

[51] Int. Cl.² ............................................. B01D 53/34
[52] U.S. Cl. ........................... 423/213.5; 252/466 PT
[58] Field of Search ........................... 423/213.2, 213.5

[56] References Cited

U.S. PATENT DOCUMENTS

| 3,619,127 | 11/1971 | Hass .................................. 423/213.5 |
| 3,839,225 | 10/1974 | Acres .................................. 252/465 |
| 3,840,471 | 10/1974 | Acres ............................. 423/213.5 X |
| 3,895,093 | 7/1975 | Weidenbach et al. ............ 423/213.5 |

Primary Examiner—G. O. Peters
Attorney, Agent, or Firm—Bacon & Thomas

[57] ABSTRACT

Disclosed is a method of purifying exhaust gases from an internal combustion engine operated with a substantially stoichiometric fuel-to-air mixture, the gases having an L-value of from about 0.8 to 1.2, wherein the exhaust gases are brought into contact with a catalyst comprising molybdenum, rhodium and, optionally, platinum supported on a carrier.

8 Claims, No Drawings

PURIFICATION OF EXHAUST GASES

BACKGROUND OF THE INVENTION

This invention relates to a method of purifying exhaust gases from internal combustion engines, especially exhaust gases from motor vehicles, the purification being effected catalytically and serving to simultaneously remove hydrocarbons, carbon monoxide and nitrogen oxides from the gases when a nearly stoichiometric fuel-air ratio is being maintained. Such catalytic converters are well known in the art.

It is known that the gases which are exhausted from an internal combustion engine when the fuel-air ratio is nearly stoichiometric ($\lambda = 0.99 - 1.01$) contain only a little carbon monoxide, hydrogen and unburned hydrocarbons, whereas their content of nitroen oxide is higher in comparison to a richer adjustment. On the other hand, an exhaust gas from the combustion of a nearly stoichiometric mixture also contains a quantity of oxygen which is roughly equivalent to the quantity of the components that have not been burned. Since it is technically possible to adjust fuel-air mixtures to stoichiometric proportions and to maintain these proportions during operation, an exhaust gas which is nearly free from carbon monoxide, hydrocarbons and nitrogen oxides will be obtained if the nitrogen oxides can be successfully catalytically reacted with some of the hydrogen or carbon monoxide present in the exhaust gas to form nitrogen, and the hydrocarbons and the remainder of the carbon monoxide present in the exhaust can likewise be reacted with the oxygen.

In principle the following reactions would be involved $$CO + 0.5\, O_2 \rightarrow CO_2 \tag{1}$$

$$C_nH_{2n+2} + \frac{6n+2}{4} O_2 \rightarrow nCO_2 + \frac{2n+2}{2} H_2O \tag{2}$$

(for paraffinic hydrocarbons)

$$H_2 + 0.5\, O_2 \rightarrow H_2O \tag{3}$$

$$CO + NO \rightarrow CO_2 + 0.5\, N_2 \tag{4}$$

$$H_2 + NO \rightarrow H_2O + 0.5\, N_2 \tag{5}$$

If the stoichiometric proportion of the oxidizing to the reducing reactants in the exhaust gas is equated with unity, the following relationship will hold $$L = \frac{(O_2) + 0.5\,(NO)}{0.5\,(CO) + 0.5\,(H_2) + \frac{6n+2}{4}(C_nH_{2n+2})} = 1 \tag{6}$$

In this equation $(O_2)$, $(NO)$, $(CO)$, $(H_2)$ and $(C_nH_{2n+2})$ are the molar concentrations of oxygen, nitric oxides, carbon monoxide, hydrogen and hydrocarbons, respectively, and $n$ is an integer If the ratio $L < 1$, the reducing components of the system are preponderant, whereas if the ratio $L > 1$ there is an excess of oxidizing components. This ratio is hereinafter referred to as the L-value of the exhaust gas.

If the fuel-air ratio supplied to the vehicle engine is kept constant between about 0.99 and 1.01 by a control system of fuel injection, the exhaust gas will contain on the order of about 1% carbon monoxide, 0.4% hydrogen, 0.02% propane, and 0.1% nitric oxide, whereas the oxygen content will be from about 0.5 to 0.9%. If these limits for the oxygen concentration are introduced into equation (6), all other quantities remaining unchanged, then the values of L will be $L = 0.69$, when $O_2 = 0.5\%$ and
$L = 1.19$, when $O_2 = 0.9\%$ and the stoichiometric ratio $L = 1$ will be attained when the oxygen content is 0.75%.

The effect of a catalyst for different L-values in the neighborhood of $L = 1$ (stoichiometric composition of the exhaust gas) is determined as follows:

The conversion percentages of nitrogen oxides ($NO_x$), carbon monoxide and the hydrocarbons are plotted on a graph as functions of L. The variability range of L within which the conversion percentages of the three above-mentioned exhaust gas constituents exceed 90% ($\Delta L$) can be used as a criterion for the effectiveness of the catalyst and should be as wide as possible.

Catalysts which satisfy this criterion have already been described in German Offenlegungsschrift No. 2,304,831, and consist of a combination of platinum, ruthenium, rhodium and rhenium on a carrier which has been calcined at a temperature of not less than 800° C.. These catalysts contain a relatively large proportion of noble metals and they are therefore expensive.

German Offenlegungsschrift No. 2,306,395 describes supported catalysts which comprise an intermetallic system consisting of at least three metals as the catalytically active component, the system including a platinum group metal and one base metal selected from aluminum, titanium, chromium, manganese, cobalt and nickel. Such catalysts also have a relatively high noble metal content.

SUMMARY OF THE INVENTION

It is therefore an object of the present invention to provide an improved process for the purification of exhaust gas, particularly exhaust gas from an internal combustion engine.

Another object of the invention resides in the provision of an improved exhaust gas purification process employing an improved catalyst.

It is also an object of the invention to provide an improved process and catalyst wherein smaller amounts of noble metal are used in the catalyst.

A further object of the invention is to provide an improved process and catalyst for simultaneously removing hydrocarbons, carbon monoxide and nitrogen oxides from an automatic exhaust gas.

In accomplishing the foregoing objects, there has been provided in accordance with the present invention a process for purifying exhaust gases from an internal combustion engine being operated with a substantially stoichiometric fuel-to-air mixture, the exhaust gases containing hydrocarbons ($C_nH_{2n+2}$), carbon monoxide and nitric oxide and having an L-value of between about 0.8 and 1.2 where $$L = \frac{[O_2] + 0.5\,[NO_x]}{0.5\,[CO] + 0.5\,[H] + \frac{6n+2}{4}[C_nH_{2n+2}]}$$

and $n$ is an integer, comprising the step of contacting the exhaust gases at an elevated temperature with a catalyst comprised of catalytically effective amounts of molybdenum and rhodium supported on a carrier, which has been calcined at a temperature of at least about 800° C., whereby the hydrocarbons, carbon monoxide and nitric oxide are simultaneously removed from said exhaust gases. Preferably the molybdenum and rhodium are present in the catalyst in an atomic ratio of from about 1:1 to 4:1, most preferably about 2:1. Typically, the catalyst contains from about 0.01 to 0.1% by weight each of molybdenum and rhodium, and more preferably from about 0.02 to 0.08% by weight of molybdenum and from about 0.2 to 0.04% by weight of rhodium. In a preferred embodiment of the invention, the catalyst further comprises platinum, preferably from about 0.01, to 0.1% by weight and more preferably from about 0.04 and 0.08% by weight thereof.

DETAILED DESCRIPTION OF PREFERRED EMBODIMENTS

Unexpectedly it has now been found that if molybdenum is used as an active catalytic component the required quantity of platinum metals can be very considerably reduced. A catalyst having a low content of noble metals has now been developed, which oxidizes the hydrocarbons and carbon monoxide while at the same time reducing the nitrogen oxides within a wide range of L-values.

Accordingly, the present invention provides a method of purifying exhaust gases from an internal combustion engine operated with a substantially stoichiometric fuel-to-air mixture, the gases having an L-value (as hereinabove defined) of from about 0.8 to 1.2, wherein the exhaust gases having a temperature between 300° and 1000° C are brought into contact with a catalyst comprising molybdenum, rhodium and, optionally, platinum supported on a carrier which has been calcined at a temperature of not less than about 800° C.

The molybdenum, rhodium, and optional platinum content of the catalyst may be from about 0.01 to 0.1% by weight of each metal, and the catalyst preferably contains, by weight, about 0.02 to 0.08% molybdenum, about 0.02 to 0.04% rhodium, and about 0.04 to 0.08% platinum, the atomic ratio of molybdenum: rhodium being preferably from about 1 : 1 to 4 : 1.

Although catalysts which contain exclusively molybdenum and rhodium as their active components are very effective, their activity and thermal stability can be further improved by an addition of platinum.

Suitable carriers for the present catalyst, are carriers consisting of alumina and aluminosilicates molded into highly refractory and abrasion-resistant pellets such as extrudates, spheres and other shapes. Preferably the content of sodium oxide in such carriers is kept under about 0.1% and the content of anions derived from inorganic acids, such as Cl' or $SO_4''$, is kept under about 0.2%.

Before being provided with the catalytically active components, the carrier material is calcined at a temperature of not less than about 800° C. e.g., for about 10 to 120 minutes at a temperature of from 800° to 1500° C., preferably from 800° to 1100° C. Cellular or corrugated ceramic bodies made of refractories such as cordierite, β-spodumene, mullite, alpha-alumina, or combinations of these substances, and coated with aluminum oxide are also suitable as carriers.

The application of the active components to the carrier is effected by impregnation with water-soluble compounds of the catalytically active components.

If the catalysts are to contain platinum, it is preferable to apply the platinum after impregnation of the carrier with molybdenum and rhodium compounds has been completed, and to use a solution containing platinum in the form of platinum tetrammine hydroxide.

When preparing catalysts of which the carrier is a cellular ceramic, either all the active components may be incorporated in the suspension used for applying the aluminum oxide coating or, in the case of catalysts containing platinum, only molybdenum and rhodium will be incorporated in the suspension, the platinum being introduced by impregnation with a solution of platinum tetrammine hydroxide.

The application of the active components to cellular ceramic bodies may also proceed by impregnating the carrier after it has been coated with aluminum oxide.

The invention will now be more particularly described with reference to the following illustrative Examples.

EXAMPLE 1

Catalysts numbered 1 to 3 are prepared as follows:

A commercial spheroidal carrier material of active alumina is calcined for 1 hour at 1000° C. and then impregnated at boiling temperature with an aqueous solution containing 0.20 g. of rhodium in the form of rhodium nitrate and, additionally in the case of catalyst No. 1, 0.187 g. of molybdenum, in the case of catalyst No. 2, 0.374 g. of molybdenum, and in the case of catalyst No. 3, 0.561 g. of molybdenum in the form of ammonium molybdate, per liter of carrier employed bulk density of the carrier 0.75 kg/l). The removal of surplus solvent is effected at 120° C. in a rotary dryer and the catalysts are then calcined at 800° C. The finished catalysts Nos. 1 to 3 then have the following compositions:

| Catalyst No. | Mo | Rh |
|---|---|---|
| | (% by weight) | |
| 1 | 0.025 | 0.027 |
| 2 | 0.050 | 0.027 |
| 3 | 0.075 | 0.027 |

EXAMPLE 2

Catalysts Nos. 1 to 3 produced as described in Example 1 are treated with an aqueous solution at its boiling point containing 0.4 g. platinum in the form of platinum tetrammine hydroxide per liter of catalyst. The removal of surplus solvent is effected at 120° C. in a rotary dryer. The finished catalysts Nos. 4-6 have the following compositions after calcination at 800° C.:

| Catalyst No. | Pt | Rh | Mo |
|---|---|---|---|
| | (% by weight) | | |
| 4 | 0.053 | 0.027 | 0.025 |
| 5 | 0.053 | 0.027 | 0.050 |
| 6 | 0.053 | 0.027 | 0.075 |

EXAMPLE 3

The carrier used in Example 1 is impregnated with an aqueous solution at its boiling point containing 0.2 g. rhodium in the form of rhodium nitrate, 0.4 g. platinum in the form of hexachloroplatinic acid and 0.374 g. of molybdenum in the form of ammonium molybdate, per liter of carrier used. The removal of surplus solvent is effected at 120° C. in a rotary dryer. After having been calcined at 800° C., the prepared catalyst No. 7 has a metal content comprising 0.053% by weight of platinum, 0.027% by weight of rhodium and 0.05% by weight of molybdenum.

EXAMPLE 4

A cellular ceramic body made of cordierite (bulk density 0.72 kg./l.)) is immersed in a suspension of 20% by weight of finely-divided pseudo-beohmite (aluminum oxide content 73.5% by weight, grain size $<3\mu$), and 1.65% by weight of finely divided cerium oxide (grain size $<3\mu$). After having been dried at 200° C. and calcined at 900° C. the body is treated at the boiling point with an aqueous solution of 0.4 g. molybdenum in the form of ammonium molybdate, 0.2 g. rhodium in the form of rhodium nitrate and 0.4 g. platinum in the form of hexachloroplatinic acid, per liter of carrier treated. The removal of the surplus solvent is effected at 120° C. in a rotary dryer. After having been calcined at 800° C., the finished catalyst No. 8 contains 0.055% by weight of molybdenum, 0.028% by weight of rhodium and 0.055% by weight of platinum.

EXAMPLE 5

A cellular ceramic body made of cordierite (bulk density 0.72 kg./l. ) is immersed in a suspension consisting of 20% by weight of finely divided pseudo-boehmite (aluminum oxide content 73.5% by weight, grain size $<3\mu$), 1.65% by weight of finely-divided cerium oxide (grain size $<3\mu$), 0.265% by weight of molybdenum in the form of ammonium molybdate, 0.142% by weight of rhodium in the form of rhodium nitrate and water. After having been dried at 120° C. and calcined at 800° C. the finished catalyst No. 9 contains 0.055% by weight of molybdenum and 0.029% by weight of rhodium.

EXAMPLE 6

A catalyst produced as described in Example 5 is treated with a solution at boiling point containing 0.4 g. of platinum per liter of catalyst in the form of platinum tetrammine hydroxide. The removal of surplus solvent is effected at 120° C, in a rotary dryer. After having been calcined at 800° C. the finished catalyst No. 10 contains 0.55% by weight of platinum, 0.029% by weight of rhodium and 0.055% by weight of molybdenum.

EXAMPLE 7

For the purpose of testing their activities, catalysts Nos. 1 to 10 are contacted with a gas mixture with a composition approximating that of an automative exhaust gas when the air-fuel mixture in the engine is kept approximately stoichiometric. Since the $\Delta$ L-value depends on the conversion of the oxides of nitrogen and of the carbon monoxide and since, as a matter of experience, the percentage conversion of the hydrocarbons in this range is above 90%, the admixture of hydrocarbons was dispensed within the preparation of the test gas.

The gas mixture used had the following composition:

| 0.1% | by vol. | NO |
|---|---|---|
| 1 | " | CO |
| 0.4 | " | $H_2$ |
| 10 | " | $CO_2$ |
| 14 | " | steam |
| 0.3–0.8 | " | $O_2$ |
| balance | | $N_2$. |

The oxygen content was varied from 0.3 to 0.8% by volume. The space velocity was 50,000 (v./vh.) and the gas entry temperature was 500° C. If the stoichiometric ratio of the oxidizing to the reducing reactants is equated with unity, then the following equation will hold:

$$L = \frac{(O_2) + 0.5 \, (NO)}{0.5 \, (CO) + 0.5 \, (H_2)}$$

The range of L within which the percentage conversions of carbon monoxide and nitric oxide exceed 90% ($\Delta L$) is the criterion for assessing the effectiveness of the catalyst.

After having been tested when fresh under the stated conditions, the catalysts were each aged in air for 24 hours at 870° and 980° C. respectively. After each aging step, a fresh activity test was performed. The results are collated in Tables 1 (catalysts 1 – 3), 2 (catalysts 4 – 7) and 3 (catalysts 8 – 10).

It will be apparent from the listed results that the catalysts containing molybdenum and rhodium as active components reduce the nitric oxide and carbon monoxide contents of the tested gas by at least 90% within a wide $\Delta L$ range (catalysts Nos. 1 – 3 and No. 9). Catalysts in which the ratio of Mo : Rh is 2 : 1 are the most effective.

An addition of platinum improves the activity and themal stability (catalysts Nos. 4 to 8 and No. 10).

TABLE 1

| | | | CATALYST 1 | | | | CATALYST 2 | | | | CATALYST 3 | | | |
|---|---|---|---|---|---|---|---|---|---|---|---|---|---|---|
| $O_2$ Vol. | L % | Aging | NO- Conv. % | $NH_3$ form. ppm | CO Conv. % | $\Delta L$ | NO- Conv. % | $NH_3$ form. ppm | CO Conv. % | $\Delta L$ | NO- Conv. % | $NH_3$ form. ppm | CO Conv. % | $\Delta L$ |
| 0.30 | 0.50 | Fresh | 100 | 150 | 72 | 0.20 | 100 | 380 | 82 | 0.38 | 100 | 320 | 77 | 0.33 |
| 0.40 | 0.64 | | 100 | 50 | 80 | | 100 | 270 | 88 | | 100 | 170 | 82 | |
| 0.50 | 0.79 | | 100 | 30 | 87 | | 100 | 120 | 92 | | 100 | 60 | 91 | |
| 0.55 | 0.86 | | 100 | 10 | 92 | | 100 | 70 | 97 | | 100 | 30 | 95 | |
| 0.60 | 0.93 | | 100 | 0 | 97 | | 100 | 20 | 98 | | 100 | 20 | 96 | |
| 0.65 | 1.00 | | 100 | 0 | 99 | | 100 | 0 | 99 | | 100 | 10 | 99 | |
| 0.70 | 1.07 | | 68 | 0 | 100 | | 100 | 0 | 100 | | 100 | 0 | 99 | |
| 0.75 | 1.14 | | | | | | 75 | 0 | 100 | | 77 | 0 | 100 | |
| 0.80 | 1.22 | | | | | | | | | | | | | |
| 0.30 | 0.50 | 24h 870° C. | 100 | 100 | 70 | 0.19 | 100 | 380 | 48 | 0.17 | 100 | 230 | 55 | 0.12 |
| 0.40 | 0.64 | | 100 | 60 | 75 | | 100 | 150 | 62 | | 100 | 110 | 68 | |
| 0.50 | 0.79 | | 100 | 20 | 88 | | 100 | 40 | 72 | | 100 | 40 | 80 | |
| 0.55 | 0.86 | | 100 | 10 | 91 | | 100 | 20 | 80 | | 100 | 25 | 85 | |
| 0.60 | 0.93 | | 100 | 0 | 97 | | 100 | 10 | 97 | | 100 | 10 | 91 | |
| 0.65 | 1.00 | | 100 | 0 | 98 | | 100 | 0 | 96 | | 100 | 0 | 98 | |
| 0.70 | 1.07 | | 77 | 0 | 99 | | 100 | 0 | 99 | | 82 | 0 | 99 | |
| 0.75 | 1.14 | | | | | | 87 | 0 | 100 | | | | | |
| 0.80 | 1.22 | | | | | | | | | | | | | |
| 0.30 | 0.50 | 24h 980° C. | 100 | 300 | 45 | 0.11 | 100 | 300 | 47 | 0.13 | 98 | 350 | 46 | 0.08 |
| 0.40 | 0.64 | | 100 | 160 | 55 | | 100 | 120 | 57 | | 98 | 140 | 58 | |

TABLE 1-continued

| O₂ Vol. | L % | Aging | CATALYST 1 NO-Conv. % | CATALYST 1 NH₃ form. ppm | CATALYST 1 CO Conv. % | ΔL | CATALYST 2 NO-Conv. % | CATALYST 2 NH₃ form. ppm | CATALYST 2 CO Conv. % | ΔL | CATALYST 3 NO-Conv. % | CATALYST 3 NH₃ form. ppm | CATALYST 3 CO Conv. % | ΔL |
|---|---|---|---|---|---|---|---|---|---|---|---|---|---|---|
| 0.50 | 0.79 | | 100 | 50 | 68 | | 100 | 60 | 68 | | 99 | 50 | 70 | |
| 0.55 | 0.86 | | 100 | 20 | 76 | | 100 | 30 | 78 | | 99 | 25 | 80 | |
| 0.60 | 0.93 | | 100 | 10 | 84 | | 100 | 15 | 85 | | 99 | 15 | 88 | |
| 0.65 | 1.00 | | 100 | 0 | 92 | | 100 | 0 | 93 | | 99 | 0 | 95 | |
| 0.70 | 1.07 | | 95 | 0 | 98 | | 100 | 0 | 97 | | 73 | 0 | 99 | |
| 0.75 | 1.14 | | 78 | 0 | 99 | | 76 | 0 | 99 | | | | | |
| 0.80 | 1.22 | | | | | | | | | | | | | |

TABLE 2

| O₂ Vol. | L % | Aging | CATALYST 4 NO-Conv. % | CATALYST 4 NH₃ form. ppm | CATALYST 4 CO Conv. % | ΔL | CATALYST 5 NO-Conv. % | CATALYST 5 NH₃ form. ppm | CATALYST 5 CO Conv. % | ΔL |
|---|---|---|---|---|---|---|---|---|---|---|
| 0.30 | 0.50 | Fresh | 100 | 400 | 65 | 0.30 | 100 | 400 | 76 | 0.42 |
| 0.40 | 0.64 | | 100 | 200 | 78 | | 100 | 250 | 89 | |
| 0.50 | 0.79 | | 100 | 100 | 86 | | 100 | 150 | 96 | |
| 0.55 | 0.86 | | 100 | 40 | 90 | | 100 | 80 | 97 | |
| 0.60 | 0.93 | | 100 | 20 | 92 | | 100 | 40 | 98 | |
| 0.65 | 1.00 | | 100 | 10 | 97 | | 100 | 10 | 99 | |
| 0.70 | 1.07 | | 100 | 0 | 99 | | 92 | 0 | 100 | |
| 0.75 | 1.14 | | 94 | 0 | 100 | | 75 | 0 | 100 | |
| 0.80 | 1.22 | | 80 | 0 | 100 | | | | | |
| 0.30 | 0.50 | 24h 870° C | 100 | 300 | 67 | 0.22 | 100 | 360 | 73 | 0.24 |
| 0.40 | 0.64 | | 100 | 140 | 78 | | 100 | 200 | 79 | |
| 0.50 | 0.79 | | 100 | 40 | 81 | | 100 | 100 | 88 | |
| 0.55 | 0.86 | | 100 | 25 | 86 | | 100 | 50 | 97 | |
| 0.60 | 0.93 | | 100 | 15 | 92 | | 100 | 25 | 99 | |
| 0.65 | 1.00 | | 100 | 0 | 97 | | 100 | 0 | 99 | |
| 0.70 | 1.07 | | 100 | 0 | 99 | | 85 | 0 | 99 | |
| 0.75 | 1.14 | | 100 | 0 | 100 | | | | | |
| 0.80 | 1.22 | | 67 | 0 | 100 | | | | | |
| 0.30 | 0.50 | 24h 980° C | 100 | 300 | 43 | 0.15 | 100 | 300 | 62 | 0.18 |
| 0.40 | 0.64 | | 100 | 140 | 61 | | 100 | 200 | 64 | |
| 0.50 | 0.79 | | 100 | 70 | 76 | | 100 | 100 | 75 | |
| 0.55 | 0.86 | | 100 | 50 | 81 | | 100 | 80 | 80 | |
| 0.60 | 0.93 | | 100 | 25 | 88 | | 100 | 50 | 90 | |
| 0.65 | 1.00 | | 100 | 0 | 92 | | 100 | 0 | 96 | |
| 0.70 | 1.07 | | 100 | 0 | 96 | | 96 | 0 | 99 | |
| 0.75 | 1.14 | | 87 | 0 | 98 | | 86 | 0 | 99 | |
| 0.80 | 1.22 | | | | | | | | | |

| O₂ Vol. | L % | Aging | CATALYST 6 NO-Conv. % | CATALYST 6 NH₃ form. ppm | CATALYST 6 CO Conv. % | ΔL | CATALYST 7 N0-Conv. % | CATALYST 7 NH₃ form. ppm | CATALYST 7 CO Conv. % | ΔL |
|---|---|---|---|---|---|---|---|---|---|---|
| 0.30 | 0.50 | Fresh | 100 | 400 | 74 | 0.36 | 100 | 400 | 63 | 0.32 |
| 0.40 | 0.64 | | 100 | 200 | 86 | | 100 | 250 | 77 | |
| 0.50 | 0.79 | | 100 | 100 | 94 | | 100 | 80 | 85 | |
| 0.55 | 0.86 | | 100 | 50 | 97 | | 100 | 60 | 92 | |
| 0.60 | 0.93 | | 100 | 25 | 98 | | 100 | 25 | 97 | |
| 0.65 | 1.00 | | 95 | 10 | 99 | | 100 | 10 | 99 | |
| 0.70 | 1.07 | | 90 | 0 | 99 | | 100 | 0 | 99 | |
| 0.75 | 1.14 | | 76 | 0 | 100 | | 96 | 0 | 100 | |
| 0.80 | 1.22 | | | | | | 75 | 0 | 100 | |
| 0.30 | 0.50 | 24h 870° C | 100 | 200 | 58 | 0.18 | 100 | 380 | 12 | 0.17 |
| 0.40 | 0.64 | | 100 | 120 | 72 | | 100 | 200 | 33 | |
| 0.50 | 0.79 | | 100 | 50 | 88 | | 100 | 50 | 57 | |
| 0.55 | 0.86 | | 100 | 25 | 90 | | 100 | 25 | 70 | |
| 0.60 | 0.93 | | 100 | 10 | 96 | | 100 | 10 | 82 | |
| 0.65 | 1.00 | | 100 | 0 | 99 | | 100 | 0 | 97 | |
| 0.70 | 1.07 | | 82 | 0 | 99 | | 96 | 0 | 98 | |
| 0.75 | 1.14 | | | | | | 90 | 0 | 99 | |
| 0.80 | 1.22 | | | | | | 78 | 0 | 100 | |
| 0.30 | 0.50 | 24h 980° C | 100 | 360 | 48 | 0.16 | 100 | 400 | 45 | 0.15 |
| 0.40 | 0.64 | | 100 | 200 | 62 | | 100 | 200 | 65 | |
| 0.50 | 0.79 | | 100 | 120 | 72 | | 100 | 50 | 70 | |
| 0.55 | 0.86 | | 100 | 60 | 78 | | 100 | 25 | 77 | |
| 0.60 | 0.93 | | 100 | 30 | 84 | | 100 | 15 | 87 | |
| 0.65 | 1.00 | | 100 | 20 | 88 | | 100 | 5 | 94 | |
| 0.70 | 1.07 | | 100 | 0 | 93 | | 100 | 0 | 99 | |
| 0.75 | 1.14 | | 100 | 0 | 98 | | 82 | 0 | 100 | |
| 0.80 | 1.22 | | 86 | 0 | 99 | | | | | |

TABLE 3

| O₂ Vol. | L % | Aging | CATALYST 8 NO-Conv. % | CATALYST 8 NH₃ form. ppm | CATALYST 8 CO Conv. % | Δ L | CATALYST 9 NO-Conv. % | CATALYST 9 NH₃ form. ppm | CATALYST 9 CO Conv. % | Δ L | CATALYST 10 NO-Conv. % | CATALYST 10 NH₃ form. ppm | CATALYST 10 CO Conv. % | Δ L |
|---|---|---|---|---|---|---|---|---|---|---|---|---|---|---|
| 0.30 | 0.50 | Fresh | 100 | 400 | 60 | 0.30 | 100 | 400 | 60 | 0.19 | 100 | 400 | 72 | 0.36 |
| 0.40 | 0.64 | | 100 | 250 | 70 | | 100 | 250 | 70 | | 100 | 200 | 80 | |
| 0.50 | 0.79 | | 100 | 120 | 79 | | 100 | 100 | 89 | | 100 | 90 | 87 | |

TABLE 3-continued

| $O_2$ Vol. | L % | Aging | CATALYST 8 | | | | CATALYST 9 | | | | CATALYST 10 | | | |
|---|---|---|---|---|---|---|---|---|---|---|---|---|---|---|
| | | | NO-Conv. % | $NH_3$ form. ppm | CO Conv. % | $\Delta L$ | NO-Conv. % | $NH_3$ form. ppm | CO Conv. % | $\Delta L$ | NO-Conv. % | $NH_3$ form. ppm | CO Conv. % | $\Delta L$ |
| 0.55 | 0.86 | | 100 | 70 | 87 | | 100 | 50 | 87 | | 100 | 40 | 91 | |
| 0.60 | 0.93 | | 100 | 25 | 94 | | 100 | 15 | 92 | | 100 | 20 | 94 | |
| 0.65 | 1.00 | | 100 | 10 | 97 | | 100 | 10 | 97 | | 100 | 10 | 96 | |
| 0.70 | 1.07 | | 100 | 0 | 99 | | 98 | 0 | 99 | | 100 | 0 | 99 | |
| 0.75 | 1.14 | | 98 | 0 | 99 | | 73 | 0 | 99 | | 100 | 0 | 99 | |
| 0.80 | 1.22 | | 87 | 0 | 100 | | | | | | 87 | 0 | 100 | |
| 0.30 | 0.50 | 24h 870° C | 100 | 400 | 57 | 0.18 | 100 | 450 | 60 | 0.15 | 100 | 600 | 68 | 0.23 |
| 0.40 | 0.64 | | 100 | 200 | 59 | | 100 | 350 | 70 | | 100 | 500 | 73 | |
| 0.50 | 0.79 | | 100 | 100 | 65 | | 100 | 200 | 78 | | 100 | 300 | 80 | |
| 0.55 | 0.86 | | 100 | 50 | 78 | | 100 | 100 | 82 | | 100 | 200 | 83 | |
| 0.60 | 0.93 | | 100 | 30 | 82 | | 100 | 25 | 88 | | 100 | 100 | 88 | |
| 0.65 | 1.00 | | 100 | 10 | 89 | | 100 | 10 | 93 | | 100 | 40 | 92 | |
| 0.70 | 1.07 | | 100 | 0 | 95 | | 100 | 0 | 97 | | 100 | 25 | 95 | |
| 0.75 | 1.14 | | 100 | 0 | 0 | | 82 | 0 | 98 | | 100 | 0 | 98 | |
| 0.80 | 1.22 | | 86 | 0 | 0 | | | | | | 86 | 0 | 99 | |
| 0.30 | 0.50 | 24h 980° C | 100 | 350 | 20 | 0.18 | 100 | 450 | 65 | 0.10 | 100 | 600 | 40 | 0.18 |
| 0.40 | 0.64 | | 100 | 200 | 40 | | 100 | 200 | 70 | | 100 | 440 | 58 | |
| 0.50 | 0.79 | | 100 | 100 | 60 | | 100 | 80 | 80 | | 100 | 360 | 75 | |
| 0.55 | 0.86 | | 100 | 50 | 68 | | 100 | 40 | 85 | | 100 | 220 | 85 | |
| 0.60 | 0.93 | | 100 | 20 | 85 | | 100 | 20 | 90 | | 100 | 100 | 91 | |
| 0.65 | 1.00 | | 100 | 10 | 82 | | 100 | 5 | 97 | | 100 | 50 | 99 | |
| 0.70 | 1.07 | | 100 | 0 | 95 | | 89 | 0 | 99 | | 100 | 20 | 99 | |
| 0.75 | 1.14 | | 95 | 0 | 98 | | 77 | 0 | 99 | | 76 | 0 | 100 | |
| 0.80 | 1.22 | | 89 | 0 | 99 | | | | | | | | | |

What is claimed is:

1. In a process for purifying exhaust gases from an internal combustion engine being operated with a substantially stoichiometric fuel-to-air mixture, said exhaust gases containing hydrocarbons ($C_nH_{2n+2}$), carbon monoxide and nitric oxide and having an L-value of between about 0.8 and 1.2 where $$L = \frac{[O_2] + 0.5 [NO]}{0.5 [CO] + 0.5 [H_2] + \frac{6n + 2}{4} [C_nH_{2n+2}]}$$

and n is an integer, comprising the step of contacting said exhaust gases at an elevated temperature with a catalyst supported on a carrier which has been calcined at a temperature of at least about 800° C, whereby said hydrocarbons, carbon monoxide and nitric oxide are simultaneously removed from said exhaust gases, the improvement comprising said catalyst essentially consisting of said carrier having distributed thereon a mixture from about 0.01 to 0.1% by weight each of molybdenum and rhodium and from 0 to about 0.1% by weight of platinum.

2. The process as defined by claim 1, wherein said molybdenum and rhodium are present in said catalyst in an atomic ratio of from about 1:1 to 4:1.

3. The process as defined by claim 1, wherein said catalyst contains from about 0.02 and 0.08% by weight of molybdenum and from about 0.02 to 0.04% by weight of rhodium.

4. The process as defined in claim 1, wherein said catalyst further comprises platinum.

5. The process as defined by claim 4, wherein said catalyst contains between about 0.01 and 0.1% by weight of platinum.

6. The process as defined by claim 3, wherein said catalyst further comprises from about 0.04 to 0.08% by weight of platinum.

7. The process as defined by claim 2, wherein said ratio is about 2:1.

8. The process as defined by claim 1, wherein the temperature of the exhaust gas is in the range of 300° to 1000° C.

* * * * *